(12) United States Patent
Kim

(10) Patent No.: US 7,054,371 B2
(45) Date of Patent: May 30, 2006

(54) SYSTEM FOR REAL TIME TRANSMISSION OF VARIABLE BIT RATE MPEG VIDEO TRAFFIC WITH CONSISTENT QUALITY

(75) Inventor: Tae-Yong Kim, Suwon (KR)

(73) Assignee: Samsung Electronics Co., Ltd. (KR)

( * ) Notice: Subject to any disclaimer, the term of this patent is extended or adjusted under 35 U.S.C. 154(b) by 655 days.

(21) Appl. No.: 09/894,621

(22) Filed: Jun. 28, 2001

(65) Prior Publication Data

US 2002/0090029 A1 Jul. 11, 2002

(30) Foreign Application Priority Data

Nov. 13, 2000 (KR) .............................. 2000-67183

(51) Int. Cl.
*H04N 7/12* (2006.01)

(52) U.S. Cl. ............................................... 375/240.26

(58) Field of Classification Search ........... 375/240.03, 375/204.12, 240.16, 240.26; H04N 7/12
See application file for complete search history.

(56) References Cited

U.S. PATENT DOCUMENTS

| | | | | |
|---|---|---|---|---|
| 6,100,940 A | * | 8/2000 | Dieterich | .................... 348/700 |
| 6,205,174 B1 | * | 3/2001 | Fert et al. | .............. 375/240.03 |
| 6,212,233 B1 | * | 4/2001 | Alexandre et al. | ..... 375/240.03 |
| 6,529,552 B1 | * | 3/2003 | Tsai et al. | .............. 375/240.05 |
| 6,535,251 B1 | * | 3/2003 | Ribas-Corbera | ....... 375/240.03 |

* cited by examiner

*Primary Examiner*—Young Lee
(74) *Attorney, Agent, or Firm*—F. Chau & Associates, LLC

(57) ABSTRACT

A system and method for real time transmission of variable bit rate MPEG video traffic with consistent quality, wherein each frame is encoded with quantization parameter generated from an encoder rate controller, and encoded data is transmitted to an encoder buffer. Transmission rate about each frame interval is determined by a channel rate controller at the beginning of the frame interval. Data transmission buffered at the encoder buffer is first regulated by Leaky Bucket counter, and the regulated data is transferred to a decoder buffer in a video receiving system through network. The encoder rate controller and channel rate controller included in the VBR video transmission system control the transmission rate generated from the video encoder and that from the network with satisfying imposed constrained conditions, respectively.

22 Claims, 1 Drawing Sheet

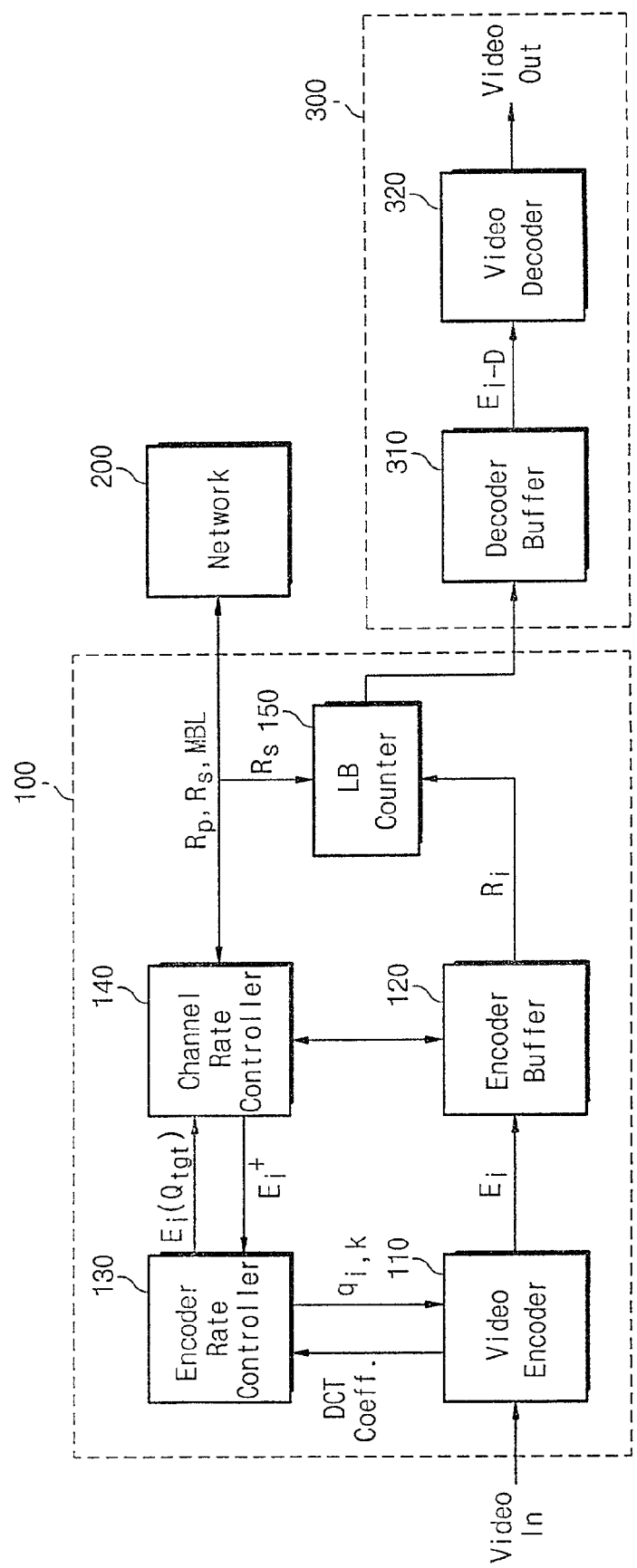

SYSTEM FOR REAL TIME TRANSMISSION OF VARIABLE BIT RATE MPEG VIDEO TRAFFIC WITH CONSISTENT QUALITY

This application claims priority from Korean Patent Application No. 2000-067183, filed on Nov. 13, 2000, which is fully incorporated herein by reference.

BACKGROUND

1. Technical Field

The present invention relates generally to a video traffic system and, more particularly, to a system for real time transmission of variable bit rate MPEG video traffic with consistent quality.

2. Description of Related Art

It is known that variable bit rate (VBR) video provides more constant quality than constant bit rate (CBR) video (see, e.g., *"A Variable Rate Video Decoder For Synchronous Transfer Mode Networks,"* by W. Verbiest and L. Pinoo, IEEE J. Select. Areas Commun., Vol. 7, No. 5, pp. 761–770, June. 1989; and *"Packet Video, Modeling and Signal Processing"*, by N. Ohta, Artech House, 1994). The VBR MPEG (Moving Picture Experts Group) coded video traffic is burst by three different encoding frame types, i.e., I-frame, P-frame, and B-frame as proposed in *"Generic Coding of Moving Pictures and Associated Audio: Video"*, ISO-IEC/JTC1/SC29/WG11/ NO801rev, MPEG Committee Draft: Rec. H. 262, April, 1995. The VBR video is highly time-variant due to successive scenes having different contents as proposed in *"Bandwidth Renegotiation For VBR Video Over ATM Networks,"* by D. J. Reininger, D. Raychaudhuri and J. Y. Hui, IEEE J. Select. Areas Commun., Vol. 4, No. 6, pp. 1076–1086, August, 1996.

A video with constant quality can be obtained by transmitting an unconstrained VBR providing similar quantization parameter to all frames, such as proposed in the above reference by D. J. Reininger, et al., as well as *"MPEG Coding For Variable Bit Rate Video Transmission"*, by P. Pancha and M. El Zarki, IEEE Commun. Mag., Vol. 32, No. 4, pp. 54–66, May. 1994. Since an ATM (Asynchronous Transfer Mode) network provides limited bandwidth, however, the ATM network requires a constrained VBR specified by three parameters of peak rate, sustainable rate, and maximum burst length. Smoothing (or shaping) is one of the most dependable methods that efficiently improves network utilization and achieves constrained VBR transmission at an acceptable delay cost, as proposed in *"Performance Models of Statistical Multiplexing In Packet Video Communications"*, by B. Maglaris, IEEE Trans. Commun., Vol. 36, No. 7. pp. 834–844, July. 1998, as well as *"Analysis of ON-OFF Source Shaping For ATM Multiplexing"*, by F. Bernabei, Proc. INFOCOM, pp. 1330–1336, 1993.

In addition to smoothing, bandwidth renegotiation is another important system for the transmission. However, undesirable operation of the smoothing and bandwidth renegotiation may give rise to unexpected encoder buffer overflow, decoder buffer overflow, or violation of the renegotiated bandwidth, which causes unwanted loss of data. The undesirable loss of data seriously deteriorates the transmitted video quality. Therefore, a method for controlling a joint encoder and channel rate is needed which considers an allocated bandwidth and sizes of the encoder and decoder buffers, such as proposed by *"Constraints on Variable Bit Rate Video for ATM Networks"*, A. R. Reibman and B. G. Haskell, IEEE Trans. Circuit Syst. Video Technol., Vol. 2, No. 4, pp. 361–372, December. 1992; and *"Joint Encoder and Channel Rate control of VBR Video over ATM Networks"*, W. Ding, IEEE Trans. Circuit Syst. Video Technol., Vol. 7, No. 2, pp. 266–278, April, 1997.

Reininger et al. proposes bandwidth renegotiation method for bandwidth renegotiation without traffic smoothing, and an method for controlling encoder rate corresponding to negotiated traffic parameters. Reibman, et al. discloses that constraints imposed on the encoded video bit rate (i.e., encoded video transmission rate) are caused by encoder and decoder buffering. Ding proposes a method for traffic smoothing, joint encoder, and channel rate control, wherein the negotiated peak rate is very large while the employed peak rate is very small. That is, the allocated peak rate is 4 times higher than the rate to have been maintained (about 180 kbits/frame) if the used peak rate is only half of the allocated peak rate. In the methods disclosed by Reibman, et al. and Ding, traffic parameters for bandwidth renegotiation and rate control cannot be obtained by on-line processing. Some techniques for traffic smoothing for VBR MPEG video are disclosed in the following references: *"Source Traffic Smoothing and ATM Network Interfaces for VBR MPG Video Encoders"*, by K. Joseph and D. Reininger, Proc. ICIP, pp. 1761–1767, 1995); *"Adaptive Prediction and Smoothing of MPEG Video in ATM networks"*, by S. Jung and J. S. Meditch, Proc, ICC, pp. 832–836, 1995); and *"An Algorithm for Lossless Smoothing of MPEG Video"* by S. S. Lam, S. Chow and D. K. Y. Yau, ACM SIGCOMM, pp. 281–293, 1994. These techniques, however, have not considered bandwidth renegotiation.

SUMMARY OF THE INVENTION

The object of the present invention is to provide an efficient system and method for real-time transmission of VBR MPEG video traffic with consistent quality.

According to one aspect of the invention, a variable bit rate video system comprises a video encoder for encoding video data, an encoder buffer for storing data encoded from the video encoder, an encoder rate controller for estimating the number of bits quantized from a target quantization parameter during a frame of the video data corresponding to discrete cosine transform (DCT) coefficients of the frame, and for providing quantization parameters based on slice level to the encoder, a channel rate controller for generating parameters for smoothing and bandwidth renegotiation corresponding to the number of bits generated from the encoder rate controller, a network for generating negotiated parameters corresponding to the parameters generated from the channel rate controller, and a Leaky Bucket counter for transmitting the video data stored the encoder buffer through the network.

In a system for transmission of variable bit rate MPEG video traffic with consistent quality, each frame is encoded with quantization parameter generated from an encoder rate controller, and an encoded data is transmitted to the encoder buffer. Transmission rate about each frame interval is determined by the channel rate controller at the beginning of the frame interval. Data transmission buffered at the encoder buffer is first regulated by the Leaky Bucket counter, and the regulated data is transferred to a decoder buffer in a video receiving system through network.

In another aspect of the invention, a method for transmission of variable bit rate MPEG video traffic with consistent quality, comprises the steps of: encoding frames of video data and generating encoding information associated therewith; estimating a number of bits quantized from a target quantization parameter during a given frame of said video data based on encoding information of the given frame; estimating a maximum number of bits capable of being generated based on network traffic parameters and buffer sizes; computing a target bit rate using the estimated number of bits quantized with the target quantization parameters and the estimated maximum number of bits; generating quantization parameters to control the actual encoding rate, if necessary, so that a number of actual bits generated does not exceed the target bit rate; and dynamically negotiating with a network to generate traffic parameters for smoothed traffic and required bandwidth.

These and other aspects, features, and advantages of the present invention will become apparent from the following detailed description of the preferred embodiments, which is to be read in connection with the accompanying drawings.

BRIEF DESCRIPTION OF THE DRAWING

The FIGURE is a block/flow diagram illustrating a system/method for transmitting and receiving VBR video according an embodiment of the present invention.

DESCRIPTION OF PREFERRED EMBODIMENTS

In one embodiment of the invention, a system and method are provided that employs both a joint encoder and channel rate control protocol that complies with negotiated traffic parameters and constraints imposed by encoder and decoder buffers. To maintain a consistent visual quality, a target quantization parameter (target Q) that is applied to each frame is selected based on factors such as encoder and decoder buffer sizes and delay. Low target Q becomes more frequently applied by encoder rate control, and resulting in significant fluctuations of visual quality of transmitted video.

For a bit rate control method, the present invention affords an efficient method for selecting target Q and dynamic bandwidth renegotiation for smoothed traffic. In a preferred bandwidth renegotiation method, the traffic parameters for the smoothed traffic and required bandwidth are estimated in real-time, and dynamically renegotiated with networks. A preferred traffic smoothing method comprises analyzing the conditions of the traffic parameters for transmission of VBR MPRG video without delay, in which peak rate can be smoothed to the sustainable rate. A coding result of unconstrained VBR or CBR with same average bandwidth are compared with the proposed algorithm using simulations. Simulation results of the present invention have shown that a consistent quality video can be transmitted in accordance with the preferred algorithm.

It is assumed that the consistent visual quality of transmitted video can be achieved when,similar target quantization parameters are applied to the same type of frames within a scene. A preferred system and method for transmitting/ receiving VBR MPEG video will now be described in further detail.

The FIGURE is a block diagram illustrating a system for transmitting and receiving VBR video data in accordance with an embodiment of the present invention. It is to be understood that the FIGURE further depicts a method for transmitting and receiving VBR video data according to one aspect of the present invention. The system comprises a VBR video transmission system 100 and a VBR video receiving system 300. The transmission system 100 comprises a video encoder 110, an encoder buffer 120, a Leaky Bucket (LB) counter 150, an encoder rate controller (ERC) 130, and a channel rate controller (CRC) 140. The VBR video receiving system 300 comprises a decoder buffer 310 and a video decoder 320. The ERC 130 and CRC 140 control the rate generated from video encoder 110 and the rate transmitted from a network 200, respectively, satisfying the imposed constraints.

Each frame is coded with a quantization parameter $E_i(Q_{tgt})$ provided by the encoder rate controller 130. Coded data from the video encoder 110 is transferred to the encoder buffer 120. Transmission rate for each frame interval is determined by the channel rate controller 140 at the beginning of the frame interval. The transmission of buffered data is first regulated by Leaky Bucket (LB) counter 150, and regulated data is transferred to the decoder buffer 310 via network 200. It is assumed that a delay within the network is constant and, therefore, the delay within the network can be ignored for purposes of designing rate control protocol according to the invention.

In accordance with a preferred embodiment of the invention, the system selects an appropriate set of target quantization parameters for each frame type. The joint encoder and channel rate control comply with the constraints imposed by the encoder and decoder buffer sizes and the negotiated traffic parameters.

The following notations are used herein for the description. $Q_{tgt}=Q_I, Q_P, Q_B$ comprises a set of target quantization parameters, where $Q_I$, $Q_P$, and $Q_B$ are the parameters associated with the I-frame, P-frame, and B-frame, respectively. T denotes time duration corresponding to an uncoded frame. The terms $E_i$ and $R_i$ respectively represent the number of bits generated and transmitted during the interval $[(i-1)T, iT]$. $E_i^+$ and $R_i^+$ denote the maximum number of bits capable of being generated and transmitted during i-th frame period, respectively. $E_i^{tgt}$ denotes the target number of bits to be generated during i-th frame period. $E_i(Q_{tgt})$ and $\tilde{E}_i(Q_{tgt})$ denote the actual and estimated number of bits as being quantized with target quantization parameters $Q_{tgt}$ during i-th frame, respectively. D represents delay within frames, that is, after the decoder begins to receive data, it waits DT seconds before starting to decode. $B_i^e$ and $B_i^d$ denote the buffer states in accordance with bits of encoder and decoder at the end of the i-th frame period t=iT, respectively. $B_{max}^e$ and $B_{max}^d$ denote the buffer sizes in bits of encoder and decoder, respectively. $L_{max}$ denotes the size of the Leaky Bucket (LB) counter in bits. $L_i$ is the state of LB counter in bits at the end of the i-th frame period t=iT.

The operations of the video transmission system 100 are as follows. It is assumed that the i-th frame is available for being coded. The encoder rate controller (ERC) 130 estimates $\tilde{E}_i(Q_{tgt})$ when the frame is encoded with target quantization parameters $Q_{tgt}$ by using information obtained from the current frame such as discrete cosine transform (DCT) parameter as well as previously coded frame. The ERC 130 calculates the target bit rate $E_{tgt}$ by using $\tilde{E}_i(Q_{tgt})$ and $E_i^+$ provided from the channel rate controller (CRC) 140. Then, the ERC 130 controls the actual encoder rate (which preferably does not exceed the target rate) by appropriately assigning quantization parameter on the basis of slice-level, i.e. $q_{i,k}, (k=0,1,\ldots,N_{slice}-1)$ The CRC 140 estimates traffic parameters for smoothing and bandwidth renegotiation by using $E_j(Q_{tgt})$, $[j=i-G_{N+1},\ldots,I]$ that is provided from the ERC 130. If necessary, the CRC 140 renegotiates with networks for the newly required bandwidth. And the CRC 140 determines the actual rate transmitted from encoder buffer 120 by using the calculated upper bounds $E_i^+$ and $R_i^+$ satisfying the constraints imposed by encoder and decoder buffers and the negotiated parameters. If necessary, bits are filled in order to avoid underflow within the encoder buffer 120.

The Leaky Bucket (LB) counter 150 is a device for policing traffic, which increases $R_i$ bits and decrease $R_s$ bits during the i-th frame coding period. When the LB counter is full, predetermined data transferred from the encoder buffer are discarded. For example, if $R_i = R_s$ (or $K_p = 0$), the LB counter size $L_{max} = 0$, as the result, the channel rate is limited to $R_s$.

The video decoder 320 starts decoding i-th frame at $t = (i+D-1)T$, and completes the decoding at $t = (i+D)T$. Therefore, all data of the i-th frame should be transmitted to the decoder buffer 310 by $t = (i+D)T$.

The constraints on encoder and channel rate are described in detail in the above-identified references by Reibman and Haskell. A preferred range of encoder and channel rates imposed by traffic parameters of buffer sizes of the encoder and decoder is as follows.

The video decoder 320 waits during D frame periods to start decoding after data begins to be received. The encoder rate $E_i$ should be transmitted before $t = (i+D)T$. When the channel rate is $R_i$, the buffer states are described as equations (1) and (2).

$$B_i^e = B_{i-1}^e + E_1 - R_i, \quad 0 \leq B_i^e \leq B_{max}^e \quad (1)$$

$$B_i^d = B_{i-1}^d + R_i - E_{i-D}, \quad 0 \leq B_i^d \leq B_{max}^d \quad (2)$$

where $B_i^e = B_i^d = 0$ and $E_i = R_i = 0$ for $i \leq 0$.

The traffic policer comprises an LB counter 150 and detects a state of the virtual buffer inside the network 200. The LB counter receives $R_i$ bits and outputs $R_s$ during the i-th frame period. When the LB counter size is $L_{max}$, the LB counter state at the end of the i-th frame period $t = iT$ is $$L_i = \min\{L_{max}, \max\{0, L_{i-1} + R_i - R_s\}\} \quad (3)$$

where $i = 1, 2, \ldots$ and $L_0 = 0$.

The system cannot store more than $B_{max}^e + B_{max}^d$ bits at any given time. If the number of bits coded from successive D frames is larger than the total size of system buffers $B_{max}^e + B_{max}^d$, some coded data may be lost by the buffer overflow. Therefore, the following relationship is valid for $i \square D$.

$$\sum_{j=0}^{D-1} E_{i-j} \leq B_{max}^e + B_{max}^d \quad (4)$$

The above relationship is readily obtained from Equations (1) and (2). It is noted that the encoder rate (or the target quantization parameter) and the delay are closely related to the encoder buffer 120 and decoder buffer 310 sizes.

If the channel rate is selected within the maximum rate allowed by the decoder buffer 310 and LB policer, the delay constraints can be guaranteed. From equations (2) and (3), the maximum number of bits $R_i^+$ capable of being transmitted during the i-th frame period can be represented as follow.

$$R_i^+ = \min\{B_{max}^d - B_{i-1}^d + E_{i-D}, L_{max} - L_{i-1} + R_s\} \quad (5)$$

As mentioned above, the encoder rate $E_i$ preferably satisfies the conditions of the decoder buffer overflow at decoding time as well as the encoder buffer overflow at encoding time. Therefore, the maximum number of bits $E_i^+$ capable of being generated by video encoder can be obtained by equations (1) and (2) as follows.

$$E_i^+ = \min\{B_{max}^e - B_{i-1}^e + R_i^+, B_{i+D-1}^d + R_{i+D}^+\} \quad (6)$$

where $B_{i+D-1}^d$ and $R_{i+D}^+$ can be calculated by using $E_j$, $j = i, i+1, \ldots, i+D-1$ and equation (5), as described in the above-identified reference by Reibman. Additionally, the actual encoder rate $E_i$ and the actual channel rate $R_i$ preferably satisfy the encoder underflow condition, $B_{i-1}^e \leq R_i - E_i$. However, when the encoder buffer underflow is expected, it can be avoided by stuffing bits appropriately.

If the number of bits coded from successive D frames are larger than the system buffer size, $B_{max}^e + B_{max}^d$, some frames following them should be coded with larger quantization parameters than the set of target quantization parameter $Q_{tgt}$ so as to avoid loss of coded data. This causes degradation of visual quality of transmitted video, and as a result, an unintentional fluctuation of the quality of video may occur. The fluctuation can be avoid by the right selection of $Q_{tgt}$ considering the system buffer size.

It is assumed that D is less than or equal to the GOP (group of picture) size. When one of D frames is an I-frame, the largest buffer is preferred. The D frames comprise one I-frame, $N_P$ P-frames, and $N_B$ B-frames. If the number of bits of the I-frame, P-frame, and B-frame are ratios of x:y:z, respectively, all frames will have a similar visual quality, and the number of bits capable of being allocated to I-frame is given as follows.

$$E_I = \frac{x(B_{max}^e + B_{max}^d)}{x + yN_p + zN_B} \quad (7)$$

It is noted that x, y, and z are empirically selected, such as x:y:z=4:2:1. In the reference "*An Accurate Control of MPEG Video By Rate-Codewords Modeling*," by T. Y. Kim and J. K. Kim, Proc. ISCAS'97, pp. 1261–1264, 1997, a bit rate estimation model (transmission rate) and an actual bit rate control algorithm (actual transmission rate control algorithm) are based on the linear relationship between codeword count and real bit count, and the target quantization parameter for I-frame is given as follow.

$$Q_I^\tau = \underset{Q_I}{\mathrm{argmin}} \left| C_i(Q_I) - \tilde{C}_i(E_I) \right| \quad (8)$$

where $C_i(Q_I)$ means the number of codewords generated by using the I-frame quantization parameter $Q_I$ calculated from the pre-analysis of discrete cosine transform (DCT) coefficients, and $\tilde{C}_i(E_I)$ is the number of codewords estimated from the target bit count $E_I$ given by equation (7). That is, $$\tilde{C}_i(E_I) = \frac{E_I - \beta}{\alpha} \quad (9)$$

where $\alpha$ and $\beta$ are model parameters calculated from the coded results of previous frame with the same type. The P-frame and B-frame quantization parameters $Q_P$ and $Q_B$ are determined, so that the peak signal to noise ratio (PSNR) of P-frame and B-frame may be equivalent to I-frame. According to the present invention, $\{Q_I, Q_P, Q_B\} = \{3, 4, 5\}$ for $QI \leq 3$, $\{Q_I, Q_P, Q_B\} = \{Q_I, Q_I+1, Q_I+2\}$ for $4 \leq Q_I \leq 9$, and $\{Q_I, Q_P, Q_B\} = \{Q_I, Q_I+2, Q_I+4\}$ for $10 \leq Q_I$.

It is noted that the set of target quantization parameter $Q_{tgt}$ should be selected before each frame is coded. Indeed, whenever there are scene changes, modification of the quantization parameters using the above procedure would be very efficient for keeping consistent visual quality. Furthermore, even when there is no scene change, if many frames are coded by quantization parameters different from the $Q_{tgt}$, the $Q_{tgt}$ should be modified.

It is assumed that $E_i(Q_{tgt})$ and $\tilde{E}_i(Q_{tgt})$ are the actual and estimated number of bits quantized with $Q_{tgt}$ fro the i-th frame, respectively. In case of test model 5 (TM5), $\tilde{E}_i(Q_{tgt})=X/Q_{tgt}$, where X is global complexity of the previous frame with the same type. In the above reference by Kim et al., the number of bits $\tilde{E}_i(Q_{tgt})$ is estimated exactly by using the linear relationship between the number of codewords and the estimated number of bits as follows.

$$\tilde{E}_i(Q_{tgt}) = \alpha C_i(Q_{tgt}) + \beta \quad (10)$$

where $\alpha$ and $\beta$ are same as the parameters of equation (9). In case of ideal estimation, $\tilde{E}_i(Q_{tgt})$ is equal to $E_i(Q_{tgt})$. The method by the linear relationship provides much more excellent estimation performances than the TM5 proposed by the paper of Kim et al. In a preferred embodiment of the present invention, the bit rate estimation model disclosed by Kim et al is extended for the encoder rate control method.

If the i-th frame is coded with the $Q_{tgt}$, the number of bits $\tilde{E}_i(Q_{tgt})$ is generated and the encoder is controlled so as to be $E_i \leq E_i^+$. As a result, if $\tilde{E}_i(Q_{tgt}) \leq E_i^+$, a target bit rate $E_i^{tgt}$ becomes $\tilde{E}_i(Q_{tgt})$, and if $\tilde{E}_i(Q_{tgt}) > E_i^+$, $E_i^{tgt}$ becomes $E_i^+$. Then the encoder is controlled so that $E_i \leq E_i^{tgt}$. However, because of the inaccuracy of encoder rate control generated from inaccurate bit rate estimation, the target bit rate $E_i^{tgt}$ is preferably estimated as follows.

If $\tilde{E}_i(Q_{tgt}) < \alpha E_i^+$, $E_i^{tgt} = \tilde{E}_i(Q_{tgt})$ and quantize with $Q_{tgt}$ (11)

and if $\tilde{E}_i(Q_{tgt}) \geq \alpha E_i^+$, $E_i^{tgt} = \alpha E_i^+$ and control the encoder rate where the constant $\alpha$ is selected so that the actual bit rate does not exceed the bit rate bound, i.e. $E_i \leq E_i^+$, and in the present invention, it is preferred that 0.9 is used for the constant $\alpha$. It is preferred that, for VBR MPEG video, all frames are coded with the target parameter $Q_{tgt}$ to maintain consistent visual quality from frame to frame. However, because of several constraints imposed by traffic parameters and buffer sizes, the actually generated bit counts $E_i$ may be different from the real bit counts $E_i(Q_{tgt})$ coded by using the $Q_{tgt}$. If the encoder rate is controlled so that $E_i \leq E_i^+$, then overflows within the encoder buffer can not occur. Underflows that may be generated at $E_i \ll E_i^+$ can be solved by stuffing bits.

However, if $E_i > E_i^+$, some data may be lost by overflows in the encoder buffer or underflows in the decoder buffer. This is preferably solved by appropriately selecting quantization parameters of each slice in a frame as follows.

If $q_{i,k}$ is the actually applied quantization parameter to k-th slice in the i-th frame, k=0, 1, . . . , $N_{slice}$−1 and the $N_{slice}$ means the number of slice in a frame. The $q_{i,k}$ comprises $\hat{q}_{i,k}$ and $\Delta q_{i,k}$, where $\hat{q}_{i,k}$ is an initial parameter determined by $E_i^{tgt}$ and $\Delta q_{i,k}$ is an additional parameter selected by considering the bit counts generated until (k−1)th slice.

First, it is required to determine the value of $\hat{q}_{i,k}$ for slice k. If $E_i^{tgt} = \tilde{E}_i(Q_{tgt})$, $\hat{q}_{i,k}$ sets the target quantization parameter $Q_{tgt}$, and if $E_i^{tgt} = \alpha E_i^+$, $\hat{q}_{i,k}$ is properly selected so as to meet the target bit rate $E_i^{tgt}$ by using the method proposed in the paper of Kim et al. The above two cases are derived from equation (11).

After determining the value of $\hat{q}_{i,k}$ for slice k, $\Delta q_{i,k}$ is determined. The $\Delta q_{i,k}$ is selected by considering the actually generated bit counts and the upper bound of bit counts to (k−1) slice in the i-th frame. If $E_{i,k}^{tgt}$ is the maximum number of bits for slice k in the i-th, $\Delta q_{i,k}$ can be obtained as follows.

$$\Delta q_{i,k} = \min\{31, \Delta q_{i,k-1}+1\}, \text{ if } \left(\sum_{j=0}^{k-1} E_{i,j} > \sum_{j=0}^{k-1} E_{i,j}^+\right) \quad (12)$$

$$\Delta q_{i,k} = \max\{0, \Delta q_{i,k-1}-1\}, \text{ if } \left(\sum_{j=0}^{k-1} E_{i,j} \leq \sum_{j=0}^{k-1} E_{i,j}^+\right)$$

where $\Delta q_{i,0}=0$, $E_{i,j}$ is the actually generated number of bits from slice j in the i-th frame. Finally, the actual quantization parameter $q_{i,k}$ is given by $$q_{i,k} = \max\{1, \min\{31, \hat{q}_{i,k}+\Delta q_{i,k}\}\} \quad (13)$$

where the value of $q_{i,k}$ is preferably limited to between 1 and 31 because $q_{i,k}$ is preferably used as a quantization step size in TM5.

The number of bits capable of being transmitted will be limited to $R_i \leq B_{i-1}^e + E_i$ from the condition of encoder underflows. Because the actual encoder rate $E_i$ cannot be known at the starting time of encoding of the i-th frame, the channel rate is redefined by the target number of bits $E_i^{tgt}$ of equation (11) as follows.

$$R_i = \min\{B_{i-1}^e + E_i^{tgt}, B_{max}^d - B_{i-1}^d + E_{i-D}, L_{max} - L_{i-1} + R_i\} \quad (14)$$

The encoder rate is controlled so that $E_i = E_i^{tgt}$. As a result, the encoder buffer underflows that may occur as $R^i = B_{i-1}^e + E_i^{tgt}$ can be solved by stuffing bits.

The channel rate $R_i$ that is computed as indicated above is the maximum rate allowed by the decoder buffer and LB counter. This method advantageously causes the encoder buffer 120 maintain large empty area as described in equation (6) of $B_{max}^e - B_{i-1}^e$. The empty area enlarges the upper bounds of encoder rate. If the encoder buffer becomes full ($B^{i-1e}$ is nearly equal to $B_{max}^e$), $E_i^+$ is limited to $R_i^+$. Therefore, control of the encoder rate is less frequently applied by the larger upper bounds of encoder rate, resulting in more consistent quality video.

Since asynchronous transfer mode (ATM) network provides a bandwidth constrained by a limit of available bandwidth or traffic contracts with each connection, it is inevitable for the connection to transmit constrained VBR. For the control of the constrained VBR, ATM forum specifies parameters such as peak rate Rp, sustainable rate Rs, and maximum burst length MBL.

The maximum bandwidth for transmitting data that is coded with $Q_{tgt}$ to guarantee the transmission of VBR MPEG video closely related to visual quality needs to be reserved within the network 200. It can be achieved by reserving the bandwidth as a peak rate of the video traffic. However, since a video sequence consists of each scene together with very different characteristics of generating bits, low network utilization is inevitable.

The smoothing (or shaping) is one of the most promising methods to reduce the peak rate of the traffic, and efficiently improve network utilization. However, if the smoothing process does not take into consideration various probable characteristics of the traffic, the problem of low network utilization still remains. The bandwidth renegotiation is another important method for overcoming the problem. The present invention provides methods for smoothing and bandwidth renegotiation.

Since frame types periodically appear based on a predefined group of pattern (GOP) of a MPEG video, traffic pattern generated from the MPEG video source is basically determined at the GOP level. Thus, to make a decision of renegotiation, it is reasonable to select an interval for monitoring the traffic during a multiple of GOP size. Preferably, one GOP period comprising $G_N$ frames is utilized for monitoring the traffic.

$E_{avg}(Q_{tgt})$ and $E_{max}(Q_{tgt})$ denote the average number and maximum number of bits per frame of GOP period including the current frame i, respectively. The average number and maximum number of bits per frame after the i-th frame are preferably coded as follows.

$$E_{avg}(Q_{tgt}) = \frac{1}{G_N} \sum_{j=0}^{G_N-1} E_{i-j}(Q_{tgt}) \quad (15)$$

$$E_{max}(Q_{tgt}) = K_m \times \max\{E_i(Q_{tgt}), E_{i-1}(Q_{tgt}), \ldots, E_{i-G_N+1}(Q_{tgt})\}$$

where $K_m (\geq 1)$ is a constant, and the purpose of the constant $K_m$ is to offer a margin for selecting the maximum bit rate $E_{max}(Q_{tgt})$. For example, if $K_m=1$, $E_{max}(Q_{tgt})$ is same as the maximum bit rate during the GOP period, and if $K_m=2$, $E_{max}(Q_{tgt})$ becomes twice of the maximum bit rate of the GOP period. The generated number of bits $E_j(Q_{tgt})$ (j=i-$G_N$+1, ..., i) in equation (15) is determined as $E_j(Q_{tgt})=E_j$ (for i-$G_N$+1 $\leq$ j<i) if the j-th frame was coded with $Q_{tgt}$, otherwise $E_j(Q_{tgt})=\hat{E}_j(Q_{tgt})$. $E_j(Q_{tgt})=\hat{E}j(Q_{tgt})$ is defined as an absolute value because the i-th frame was not coded.

$\tilde{R}_s$ and $\tilde{R}_p$ denote the normal sustainable rate and peak rate for the passed GOP period including the current frame i, respectively. $\tilde{R}_s$ and $\tilde{R}_p$ are preferably given by:

$$\tilde{R}_s = E_{avg}(Q_{tgt}) + K_s\{E_{max}(Q_{tgt}) - E_{avg}(Q_{tgt})\} \quad (16)$$

$$\tilde{R}_p = \tilde{R}_s + K_p\{E_{max}(Q_{tgt}) - \tilde{R}_s\}, \quad (17)$$

where $K_s$ and $K_p$ are constants satisfying the conditions of $0 \leq K_s \leq 1$ and $0 \leq K_p \leq 1$, respectively. Thus, $\tilde{R}_s$ and $\tilde{R}_p$ satisfy the conditions of $E_{avg}(Q_{tgt}) \leq \tilde{R}_s \leq E_{max}(Q_{tgt})$ and $\tilde{R}_s \leq \tilde{R}_p \leq E_{max}(Q_{tgt})$, respectively. If $K_p=1$, the traffic is not smoothed, i.e. $\tilde{R}_p = E_{max}(Q_{tgt})$, and defined as 'no smoothed VBR'. While if $K_p<1$, the maximum rate $E_{max}(Q_{tgt})$ is smoothed to $\tilde{R}_p(<E_{max}(Q_{tgt}))$. In this case, smoothing buffers are preferably implemented.

The object of bandwidth renegotiation is to dynamically allocate a specific bandwidth that varies based on scene content. A preferred index of traffic variation trend $UPC_{var}$ (=0, 1, 2, ...) that is given by comparing the normal sustainable rate $\tilde{R}_s$ together with the current sustainable rate $R_s$ is as follows.

If $(\tilde{R}_s<(1-b)R_s)$, decrement $UPC_{var}$ (18)

else if $((1+b)R_s<\tilde{R}_s)$, increment $UPC_{var}$ else if $(0<UPC_{var})$, decrement $UPC_{var}$ else if $(UPC_{var}<0)$, increment $UPC_{var}$ else $UPC_{var}=0$ where $0 \leq b<1$ and $UPC_{var}$ is initially set to zero. Whenever the bandwidth will be renegotiated, or not renegotiated, the bandwidth is preferably determined by comparing $UPC_{var}$ and a predefined threshold value X ($\geq 0$). That is, if $|UPC_{var}|>X$, bandwidth renegotiation by $\{R_s, R_p, MBL\} = \{\tilde{R}_s, \tilde{R}_p, \tilde{R}_p\}$ (19)

It is noted that the values of b and X determine a rate of bandwidth renegotiation. If the value of b is close to 1 or X is set to a large value, the bandwidth renegotiation hardly occurs. The time of bandwidth renegotiation $T_{nego}$ is the frame periods consuming between the beginning time and the end time of the bandwidth renegotiation. It is assumed that the bandwidth renegotiation is carried out from the next I-frame until before $T_{nego}$. It means that the current traffic parameters are replaced by new traffic parameters at the time of the next I-frame. In simulations, if $D \leq 3$ frames, $T_{nege}=3T$, otherwise $T_{nego}=DT$.

The LB counter size based on the negotiated traffic parameters is given by $$L_{max} = R_p - R_s \quad (20)$$

It means that the maximum burst length MBL in peak rate equals to the negotiated bit rate $R_p$, i.e. MBL=$R_p$ when $L_i=0$. $L_{max}$ is an adequate size of LB counter in order that the LB counter is increased by $R_s=R_p$ bits and decreased by $R_s$ bits during frame period i.

When a scene change occurs from simple to complicated scene, the current traffic parameters may be affected even though a changed frame is quantized with a large quantization parameter. This is because the previous traffic parameters are used for the changed frame that has different characteristics from the previous scene. To solve the problem, a lower bound of sustainable rate $R_s$ is preferably defined.

VBR traffic may be transmitted without delay ('no delay VBR'), or delayed in some parts by a smoothing mechanism ('smoothed VBR').

First, in the case of 'no delay VBR', ideal transmission of VBR traffic requires no delay, i.e. no buffer, and the 'no delay VBR' can be achieved when a limitless bandwidth is provided to the traffic. The limitless bandwidth can guarantee the transmission of the traffic at its peak rate. An allocation of the peak rate leads to inefficient utilization of network resources. The inefficiency can be improved by adapting a bandwidth renegotiation method according to the invention.

The conditions for 'no delay VBR' transmission comprise D=0 and $B_{max}^e + B_{max}^d = 0$. The conditions of traffic parameters for the bandwidth renegotiation are preferably as follows.

To transmit the coded data $E_i(Q_{tgt})$ with no delay, the upper bound of transmission rate is preferably $R_i^+ = \min\{E_i(Q_{tgt}), L_{max}-L_{i-1}+R_i\}$ from equation (5). Therefore, if $E_i(Q_{tgt}) \leq L_{max}-L_{i-1}+R_s$, $R_i^+ = E_i(Q_{tgt})$ for all i. It is noted that $E_i(Q_{tgt}) \leq E_{max}(Q_{tgt})$ and $R_s \leq L_{max}-L_{i-1}+R_i \leq R_p$. If $E_{max}(Q_{tgt}) \leq L_{max}-L_{i-1}+R_s=R_p$ for $E_i(Q_{tgt})=E_{max}(Q_{tgt})$ and if the average of $L_{max}-L_{i-1}+R_s$, (j=i-$G_{N+l}$, ..., i) is greater than $E_{avg}(Q_{tgt})$ for any GOP, all data can be transmitted without delay. From equations (15) and (17), a proper condition for 'no delay VBR' are $K_m>1$, $K_s>0$, and $K_p=1$ with the requirements D=0 and $B_{max}^e + B_{max}^d = 0$. If the negotiated traffic parameters are $R_s$, $R_p$, MBL, then the size of LB counter is $R_p - R_s$ from equation (20) and the upper bound of transmission rate is $R_i^+ = \min\{E_i, L_{max}-L_{i-1}+R_s\}$ from equation (5). As a result, the encoder rate is preferably controlled so that $E_i \leq R_i^+$.

In the case of 'smoothed VBR', smoothing is a preferred method to protect traffic flows from being lost as well as to improve network utilization. The present invention provides a traffic smoothing method that is capable of reducing a peak rate to a sustainable rate. It is noted that the traffic smoothing requires D>0 and $B_{max}^e + B_{max}^d > 0$.

From equations (16) and (17), there are two specific cases that the transmission rate $R_i$ is always less than or equal to the peak rate $R_p$, and the average of the $R_i$ is less than or equal to the sustainable rate $R_s$. When $K_p=1$, the peak rate $R_p$ is greater than or equal to the sustainable rate $R_s$. When $K_p=0$, the upper bound of transmission rate $R_i$ can be determined by $R_p=R_s$. In other words, the transmission rate $R_i$ is preferably smoothed to the sustainable rate $R_s$ where D>0. The 'smoothed VBR' is defined as $K_p=0$ and D>0. If $K_p \leq 1$, the maximum bit rate $E_{max}(Q_{tgt})$ is smoothed by equation (17). In the case of 'smoothed VBR', since $L_{max}=0$ from equation (20), the upper bound of channel rate of equation (5), i.e. the maximum number of bits capable of being transmitted during i-th frame period $R_i^+$ is given by $$R_i^+ = \min\{B_{max}^d - B_{i-1}^d + E_{i-D}, R_s\} \quad (21)$$

To transmit the coded data $E_i(Q_{tgt})$ with $Q_{tgt}$ at $R_i(\leq R_s)$, the condition $E_i(Q_{tgt})=E_i^+$ is preferably satisfied. When $B_{i-1}^d=0$, the maximum number of bits $R_i^+$ is limited to the sustainable rate $R_s$ from equation (21). When $R_i^+=R_s$, (j=1, i+1, ..., i+D), the largest data can be transferred by channel. In this case, the condition $E_i(Q_{tgt})=E_i^+=B_{i+D-1}+R_s$ from equation (6) is given by $$\sum_{j=0}^{D} E_{i-j}(Q_{tgt}) \leq R_s(D+1) \quad (22)$$

Equations (4) and (22) are conditions selected so that all $E_i(Q_{tgt})$ can be transmitted at the smoothed rate $R_i(=R_j)$. Since the smaller D makes $R_s$ be more closed to $E_{max}(Q_{tgt})$, the constant $K_s$ should be closed to 1. When the delay D is assumed to be equal to the total length of sequence, all frames are coded with $Q_{tgt}$ and then transmitted to constant bit rate $E_{avg}(Q_{tgt})$.

For example, a MPEG sequence is assumed to be GOP structure of IBPBPBPBPBPB. In case that the delay is D frame, among several successive (D+1) frames satisfying the conditions of equations (4) and (22), when I-frame is included in the (D+1) frames, the maximum number of bits is generated. It is assumed that the GOP structure is '1, 2, 3'. When D=3 and the data ratio of I-frame, P-frame, and B-frame for consistent visual quality is x:y:z, the smoothed sustainable rate $R_s=(x+y+2z)U/4$, where U is constant for reflecting the ratio. If x:y:z=4:2:1, $E_{max}(Q_{tgt})(=x):E_{avg}(Q_{tgt})$: $R_s=4:5/3:2$. In this case, the smoothed rate or sustainable rate $R_s$ is half of $E_{max}(Q_{tgt})$ and 20% of $E_{avg}(Q_{tgt})$. If D=5, $R_s$ is 10% larger than $E_{avg}(Q_{tgt})$.

According to the present invention, a variable bit rate MPEG video with consistent quality can be transmitted in real time.

Although illustrative embodiments have been described herein with reference to the accompanying drawings, it is to be understood that the present invention is not limited to those precise embodiments, and that various other changes and modifications may be affected therein by one skilled in the art without departing from the scope and spirit of the invention. It is to be understood that all such changes and modifications are intended to be included within the scope of the invention as defined by the appended claims.

What is claimed is:

1. A system for real time transmission of variable bit rate MPEG video traffic with consistent quality, comprising:
   a video encoder for encoding video data;
   an encoder buffer for storing encoded video data;
   an encoder rate controller for estimating a number of bits quantized from a target quantization parameter during a frame of said video data corresponding to discrete cosine transform (DCT) coefficients of said frame, and for providing quantization parameters based on slice level to said encoder;
   a channel rate controller for dynamically generating parameters for smoothing and bandwidth renegotiation corresponding to said number of bits generated from said encoder rate controller, wherein smoothing includes reducing a peak transmission rate to a sustainable transmission rate and smoothing a transmission rate to said sustainable transmission rate;
   a network for generating negotiated parameters corresponding to said parameters generated from said channel rate controller; and
   a counter for transmitting said video data stored in said encoder buffer through said network at a smoothed transmission rate, in response to said negotiated parameters.

2. The system of claim 1, wherein said channel rate controller generates the maximum number of bits capable of being generated and stored during said frame period corresponding to the negotiated parameters generated from said network.

3. The system of claim 2, wherein said channel rate controller determines an actual bit rate of said encoded video data transmitted to said network through the encoder buffer corresponding to the generated maximum number of bits.

4. The system of claim 3, wherein said channel rate controller is filled with bits to protect an underflow of said encoder buffer.

5. The system of claim 1, wherein said parameters for smoothing and bandwidth renegotiation generated from said channel rate controller comprise peak rate, sustainable rate, and maximum burst length.

6. The system of claim 2, wherein said encoder rate controller generates an actual number of bits quantized by the target quantization parameter during the frame corresponding to the maximum number of bits generated from the channel rate controller.

7. The system of claim 1, wherein the counter comprises a Leaky Bucket counter, wherein during the frame encoding period, the Leaky Bucket counter increases the number of bits and decreases the sustainable bits during the frame period.

8. The system of claim 1, wherein when said counter is full, the counter discards the data transferred from said encoder buffer.

9. The system of claim 1, wherein said network comprises an asynchronous transfer mode (ATM).

10. The system of claim 1, wherein said encoded video data comprises variable bit rate MPEG video data.

11. A method for transmission of variable bit rate MPEG video traffic with consistent quality, comprising the steps of:
   encoding frames of video data and generating encoding information associated therewith;
   estimating a number of bits quantized from a target quantization parameter during a given frame of said video data based on encoding information of the given frame;

estimating a maximum number of bits capable of being generated based on network traffic parameters and buffer sizes;

computing a target bit rate using the estimated number of bits quantized with the target quantization parameters and the estimated maximum number of bits;

generating quantization parameters to control the actual encoding rate, if necessary, so that a number of actual bits generated does not exceed the target bit rate; and dynamically negotiating with a network to generate traffic parameters that are used for dynamically adjusting bandwidth and for dynamically smoothing a transmission rate, wherein a negotiated peak transmission rate is reduced to a sustainable transmission rate, and said transmission rate is smoothed to said sustainable transmission rate.

12. The method of claim 11, wherein the encoding information comprises DCT (discrete cosine transformation) coefficients.

13. The method of claim 11, wherein the step of generating quantization parameters to control the actual encoding rate comprises generating quantization parameters based on slice level.

14. The method of claim 11, wherein the traffic parameters comprise peak rate, sustainable rate and maximum burst length.

15. The method of claim 11, further comprising the step of protecting against an underflow in an encoder buffer by stuffing bits.

16. The method of claim 11, further comprising the step of generating the actual number of bits quantized by the target quantization parameter during the given frame corresponding to the estimated maximum number of bits.

17. A program storage device readable by a machine, tangibly embodying a program of instructions executable by the machine to perform method steps for transmission of variable bit rate MPEG video traffic with consistent quality, the method steps comprising:

encoding frames of video data and generating encoding information associated therewith;

estimating a number of bits quantized from a target quantization parameter during a given frame of said video data based on encoding information of the given frame;

estimating a maximum number of bits capable of being generated based on network traffic parameters and buffer sizes;

computing a target bit rate using the estimated number of bits quantized with the target quantization parameters and the estimated maximum number of bits;

generating quantization parameters to control the actual encoding rate, if necessary, so that a number of actual bits generated does not exceed the target bit rate; and dynamically negotiating with a network to generate traffic parameters that are used for dynamically adjusting bandwidth and for dynamically smoothing a transmission rate, wherein a negotiated peak transmission rate is reduced to a sustainable transmission rate, and said transmission rate is smoothed to said sustainable transmission rate.

18. The program storage device of claim 17, wherein the encoding information comprises DCT (discrete cosine transformation) coefficients.

19. The program storage device of claim 17, wherein the instructions for generating quantization parameters to control the actual encoding rate comprise instructions for generating quantization parameters based on slice level.

20. The program storage device of claim 17, wherein the traffic parameters comprise peak rate, sustainable rate and maximum burst length.

21. The program storage device of claim 17, further comprising instructions for performing the step of protecting against an underflow in an encoder buffer by stuffing bits.

22. The program storage device of claim 17, further comprising instructions for performing the step of generating the actual number of bits quantized by the target quantization parameter during the given frame corresponding to the estimated maximum number of bits.

* * * * *